United States Patent [19]

Becker

[11] Patent Number: 4,882,140

[45] Date of Patent: Nov. 21, 1989

[54] SOLID ALUMINUM HYDROXIDE COMPOSITIONS

[75] Inventor: Larry W. Becker, Marcellus, N.Y.

[73] Assignee: General Chemical Corporation, Morristown, N.J.

[21] Appl. No.: 47,423

[22] Filed: May 6, 1987

[51] Int. Cl.$^4$ .......................... C01F 7/34; C01F 7/56; C01F 7/74

[52] U.S. Cl. ................................ 423/629; 23/305 A; 252/175; 423/467; 423/551; 423/556; 423/625; 423/DIG. 9

[58] Field of Search ............... 423/629, 628, 556, 467, 423/551, 626, 629, DIG. 9, 625; 23/305 A; 252/175

[56] References Cited

U.S. PATENT DOCUMENTS

| | | |
|---|---|---|
| 1,137,005 | 4/1915 | Jacobson . |
| 3,066,012 | 11/1962 | Wilson et al. ........................ 423/628 |
| 4,009,103 | 7/1976 | Burke ..................................... 210/51 |
| 4,388,208 | 6/1983 | Gytel ................................... 423/556 |
| 4,563,342 | 1/1986 | Gunnarsson et al. ............... 423/629 |
| 4,681,697 | 7/1987 | Doetsch et al. .................. 23/305 A |

FOREIGN PATENT DOCUMENTS 5415497 2/1979 Japan .

OTHER PUBLICATIONS

CRC Handbook of Chemistry and Physics, 62nd ed., Weast et al., eds. CRC Press, Inc., 1981, pp. 8-150.

Primary Examiner—John Doll
Assistant Examiner—Jeffrey Edwin Russel
Attorney, Agent, or Firm—Brumbaugh, Graves, Donohue & Raymond

[57] ABSTRACT

Solid aluminum hydroxide compositions having improved solubility, stability and filterability are formed by adding at least a stoichiometric amount of a solid base to a concentrated solution of an aluminum salt (about 8.3% $Al_2O_3$ or higher) and stirring vigorously. The base used has an alkali metal, alkali earth metal, or other metallic cation, and does not contribute an anion other than hydroxide to the solution. Particularly suitable bases are carbonate and bicarbonate.

12 Claims, 1 Drawing Sheet

# SOLID ALUMINUM HYDROXIDE COMPOSITIONS

BACKGROUND OF THE INVENTION

This invention relates to solid aluminum hydroxide compositions and to a method for preparing them. The compositions of the invention are readily filterable when slurried, and readily redissolvable in acidic solutions, and retain these properties for much longer periods of storage in air than previously known solid aluminum hydroxide preparations.

When freshly prepared as an amorphous solid, aluminum hydroxide can be fairly easily redissolved in acidic solutions, such as aluminum sulfate (alum) solutions, a property which is utilized in many processes for the production of basic aluminum complexes for use in water treatment. Upon standing, however, the structure of the solid aluminum hydroxide changes, such that after 7 to 14 days the aluminum hydroxide is essentially insoluble in the alum solutions. This old aluminum hydroxide must then be reprocessed by adding a strong mineral acid, such as $H_2SO_4$ and then reforming the $Al(OH)_3$ if it is to be used, and may in fact be simply discarded.

Furthermore, because of the amorphous structure of known soluble aluminum hydroxide compositions, this material generally forms a sludge or gel upon addition of water, and is not easily handled. In particular these sludges are difficult to transport, and difficult to filter. This latter difficulty complicates removal of sodium sulfate which is desirable for the production of low sulfate basic aluminum complexes.

It is therefore an object of this invention to provide aluminum hydroxide compositions that retain their solubility over substantially longer periods than known aluminum hydroxide compositions.

It is a further object of this invention to provide soluble aluminum hydroxide compositions in the form of a granular, free flowing material.

It is another object of this invention to provide a simple and convenient method of making the novel aluminum hydroxide compositions.

SUMMARY OF THE INVENTION

Aluminum hydroxide compositions according to the invention are formed by adding at least a stoichiometric amount of a solid base to a concentrated solution of an aluminum salt (about 8.3% $Al_2O_3$ or higher) and stirring vigorously. The base used has an alkali metal, alkali earth metal, or other metallic cation, and an anion such as hydroxide, carbonate or bicarbonate that does not contribute an anion other than hydroxide to the solution. Particularly suitable bases are carbonate and bicarbonate. The base may also be in the form of a metal oxide.

In accordance with the invention, the aluminum salt and the base are selected such that the adduct of the anion of the salt and the cation of the base has a hydrated form which will take up substantially all of the water from the solution. When this is the case, a substantially solid product is formed. When the adduct can take up more water than is present in the solution, as in the case where the adduct is sodium sulfate, the resulting product is a granular free flowing solid.

DETAILED DESCRIPTION OF THE INVENTION

Figure 1:
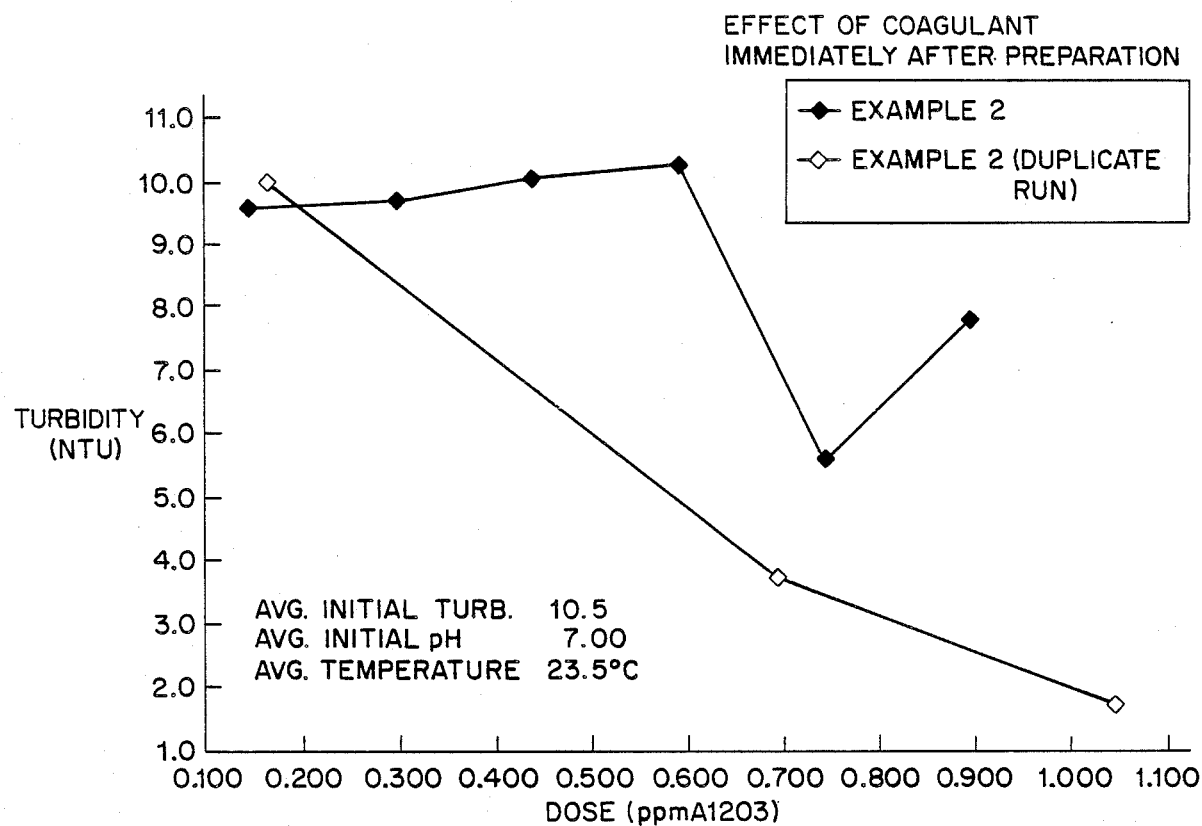
FIGS. 1 and 2 show graphically the effect on turbidity of basic aluminum sulfate made from the aluminum hydroxide of Example 1.

Aluminum salts useful in the invention are fairly soluble salts such as $AlCl_3$, $Al(NO_3)_3$, $Al(HClO_4)_3$ and $Al_2(SO_4)_3$. The utility of less soluble aluminum salts will depend on the ability to form an adduct which can take up a significant amount of the water from a concentrated solution of the aluminum salt.

Bases useful in the invention are those materials which do not contribute an anion other than hydroxide. Thus useful bases include metal hydroxides such as NaOH, KOH, and $Ca(OH)_2$, metal carbonates and bicarbonates such as $Na_2CO_3$, $NaHCO_3$, and $CaCO_3$ and metal oxides such as CaO (lime).

The base of the invention is added as a solid to a concentrated solution of the aluminum salt. Preferably, the solid is in the form of a finely divided powder to facilitate the neutralization reaction. The solid base must be added fairly rapidly so that all the base is added before the mixture solidifies. Some care must be exercised, however, when adding carbonates or other gas producing bases to reduce the risk of foam-over.

The combination of aluminum salt and base to be utilized are selected such that the adduct formed from the anion of the aluminum salt and the cation of the base can take up substantially all of the water in the solution as water of hydration. For example, the chemical reaction between soda ash and alum proceeds according to the equation:

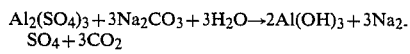

$$Al_2(SO_4)_3 + 3Na_2CO_3 + 3H_2O \rightarrow 2Al(OH)_3 + 3Na_2SO_4 + 3CO_2$$

If 300 g of concentrated alum solution (157.7 g $Al_2(SO_4)_3$ and 142.3 g $H_2O$) is reacted with a stoichiometric amount of sodium carbonate, about 25 g of water is consumed in the reaction. The sodium sulfate formed has a capacity to bind 248 g of water (assuming the formation of the decahydrate) and thus is more than able to absorb the 117 g of water remaining after the reaction. As a result, combination of alum solution and solid soda ash in accordance with the invention forms a dry, granular free flowing material.

A second example, using a different aluminum salt and a different base might involve the reaction of $AlBr_3$ with $Ca(OH)_2$ to form $CaBr_2$ as an adduct. $AlBr_3$ can be dissolved in concentrations as high as 50-60 weight % and the adduct $CaBr_2$ forms a hexahydrate. Thus, the combination of $AlBr_3$ and $Ca(OH)_2$ in accordance with the invention should form a solid product.

The solid aluminum hydroxide compositions of the invention exhibit superior solubility in acidic solutions, such as alum solution, even after periods of aging substantially longer than those tolerable for amorphous aluminum hydroxide. As a result, these solid products are highly suitable for transport in bags, thus facilitating on site preparation of basic aluminum complexes for water treatment.

Basic aluminum sulfate complexes can be prepared by adding water to the granular aluminum hydroxide product of the invention to form a slurry, for example, a slurry consisting essentially of aluminum hydroxide and sodium sulfate. This slurry is then filtered to remove the solution, having an aluminum hydroxide sludge which is added to a solution of an aluminum salt such as aluminum sulfate or aluminum chloride.

After extended aging, however, such as 6 months in open containers, it has been found that the material is no longer soluble. Moreover, aqueous slurries of the compositions exhibit excellent filterability which makes it possible to readily remove the adduct of the anion of the aluminum salt and the cation of the base before use.

The invention will now be further described by way of the following examples. These examples are not intended to limit the scope of the invention, which is set out in the accompanying claims.

EXAMPLE 1

300 g of an alum solution (8.3% $Al_2O_3$) was weighed into a reactor suitable for rapid stirring and gas evolution. 70 g of soda ash were added all at once to the alum solution. Gas evolution started immediately, and subsided after 8 to 10 minutes. After ten minutes of stirring, a white granular, free flowing product had formed which by analysis contained 14% aluminum hydroxide.

The white solid was aged for 1 to 2 hours, and then recombined with 800 ml of water to form a slurry which was then vacuum filtered to remove the sodium sulfate solution. After compression to remove as much water as possible, the resulting $Al(OH)_3$ sludge was ready for use in the production of basic aluminum sulfate.

EXAMPLE 2

The aluminum hydroxide sludge formed in Example 1 was added to 210 g of alum solution (8.3% $Al_2O_3$) to form basic aluminum sulfate. The process of dissolution took about 1 hour, which is quite rapid. No additional salts formed on standing or when cooled to 8° C. overnight. The resulting solution had an alumina content of 8.68%, a basicity of 49.5%, and was ready to use as a coagulant.

Figure 2:
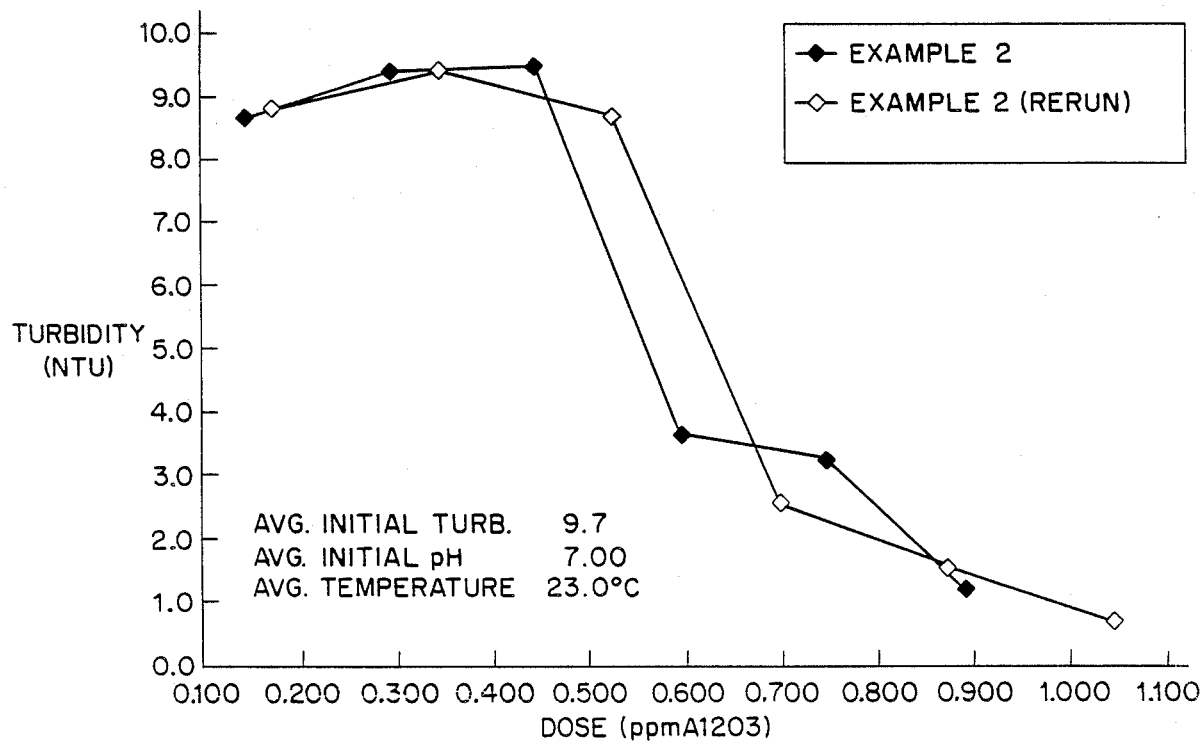

FIGS. 1 and 2 graphically shown the affect of this coagulant solution immediately after preparation and 11 weeks after preparation respectively on the turbidity of a standard sodium bentonite test solution. As can be seen from these graphs, coagulant prepared from aluminum hydroxide according to the invention was stable and retained its effectiveness over this period of time.

EXAMPLE 3

70 g of sodium carbonate was added all at once to a blender containing 300 grams of $AlCl_3$ solution (8.3% $Al_2O_3$). The mixture was stirred for about one hour, by which time a thick gel had formed. The gel was poured into a beaker and allowed to age overnight. The resulting product was rubbery and gel-like, and dissolved with difficulty.

EXAMPLE 4

The procedure of Example 3 was repeated using a 300 g of an aluminum nitrate solution. (8.3% $Al_2O_3$). After 10 minutes of stirring, crystals were formed. The granular product on aging had a wet cake appearance, and dissolved easily.

EXAMPLE 5

The procedure of Example 3 was repeated using 300 g of aluminum perchlorate solution (8.3% alumina). After about 20 minutes of stirring, crystals were formed. The product dissolved easily.

EXAMPLE 6

A granular free flowing aluminum hydroxide composition formed in accordance with Example 1 was prepared and stored in a clear container open to air for 6 months. The aged material had granular appearance, but would not dissolve in aluminum sulfate solution.

I claim:

1. A method of preparing solid aluminum hydroxide having improved solubility, filterability and stability comprising:
   (a) preparing a concentrated aqueous solution of aluminum ion and an anion by dissolving an aluminum salt;
   (b) adding to the solution a stoichiometric amount of a solid base to form a mixture, wherein the base comprises an alkali metal, alkali earth metal or other metallic cation and wherein the base does not contribute an anion other than hydroxide to the solution; and
   (c) stirring the mixture such that the aluminum salt and the base react completely to form a solid product comprising $Al(OH)_3$ and an adduct of the anion from the aluminum salt and the cation from the base, wherein the anion from the aluminum salt and the cation from the base are selected such that most of the water in the aqueous solution is bound to the adduct as water of hydration such that a substantially solid product is formed.

2. A method according to claim 1, wherein the base is a carbonate or bicarbonate.

3. A method according to claim 2, wherein the cation is sodium.

4. A method according to claim 3, wherein the anion from the aluminum salt is sulfate.

5. A granular free-flowing composition consisting essentially of aluminum hydroxide and at least partially hydrated sodium sulfate, wherein the aluminum and the sulfate are present in substantially a 2:3 mole ratio.

6. A composition according to claim 5, wherein the aluminum hydroxide and the sodium sulfate are formed by reacting a concentrated solution of aluminum sulfate with a stoichiometric amount of a solid base, said base comprising sodium cations and forming no anion other than hydroxide upon reaction with the aluminum salt.

7. A composition according to claim 6, wherein the base is selected from sodium carbonate or bicarbonate.

8. A method of preparing basic aluminum sulfate complexes comprising:
   (a) adding water to a granular free-flowing composition consisting essentially of aluminum hydroxide and at least partially hydrated sodium sulfate to form a slurry, wherein the aluminum and sulfate are present in substantially a 2:3 mole ratio;
   (b) filtering the slurry to separate an aluminum hydroxide sludge from a sodium sulfate solution; and
   (c) adding the sludge to a solution of an aluminum salt.

9. A method according to claim 8, wherein the aluminum salt is aluminum sulfate.

10. A method according to claim 8, wherein the aluminum salt is aluminum chloride.

11. A method according to claim 8, wherein the granular free-flowing composition is formed by adding a stoichiometric amount of a solid base selected from sodium carbonate or sodium bicarbonate to a concentrated solution of aluminum sulfate.

12. A method according to claim 1, wherein the base is selected from among carbonates, bicarbonates, hydroxides and oxides.

* * * * *

UNITED STATES PATENT AND TRADEMARK OFFICE
CERTIFICATE OF CORRECTION

PATENT NO. : 4,882,140

DATED : November 21, 1989

INVENTOR(S) : Larry W. Becker

It is certified that error appears in the above-identified patent and that said Letters Patent is hereby corrected as shown below:

Col. 1, line 25, "and then reforming the Al(OH)$_3$" should not appear in italics;

Col. 3, line 40, "shown" should read --show--;

Col. 3, line 58, "using a" should read --using--; and

Signed and Sealed this

Fifth Day of February, 1991

Attest:

HARRY F. MANBECK, JR.

Attesting Officer

Commissioner of Patents and Trademarks